US009389490B2

(12) United States Patent
Esarey et al.

(10) Patent No.: US 9,389,490 B2
(45) Date of Patent: Jul. 12, 2016

(54) MOUNTING DEVICE (71) Applicant: Industrial Revolution, Inc., Tukwila, WA (US)

(72) Inventors: Graeme Esarey, Seattle, WA (US); Stephen Padden, Ventura, CA (US); Lee Rawls, Woodinville, WA (US)

(73) Assignee: Industrial Revolution, Inc., Tukwila, WA (US)

( * ) Notice: Subject to any disclaimer, the term of this patent is extended or adjusted under 35 U.S.C. 154(b) by 0 days.

(21) Appl. No.: 14/146,696

(22) Filed: Jan. 2, 2014

(65) Prior Publication Data
US 2014/0191094 A1 Jul. 10, 2014

Related U.S. Application Data (60) Provisional application No. 61/748,708, filed on Jan. 3, 2013.

(51) Int. Cl.
| *G03B 17/56* | (2006.01) |
| *F16M 13/02* | (2006.01) |
| *F16M 11/14* | (2006.01) |
| *F16M 11/24* | (2006.01) |
| *F16M 13/00* | (2006.01) |

(52) U.S. Cl.
CPC .............. *G03B 17/561* (2013.01); *F16M 11/14* (2013.01); *F16M 11/242* (2013.01); *F16M 13/00* (2013.01); *F16M 13/02* (2013.01); *F16M 13/022* (2013.01); *G03B 17/56* (2013.01); *G03B 17/563* (2013.01); *G03B 17/568* (2013.01); *Y10T 29/49947* (2015.01)

(58) Field of Classification Search
CPC .... G03B 17/56; G03B 17/563; G03B 17/568; G03B 17/561; F16M 13/02; F16M 13/13022; F16M 11/242
USPC .................................................. 248/434, 166
See application file for complete search history.

(56) References Cited

U.S. PATENT DOCUMENTS

| 2,313,593 | A | * | 3/1943 | Smith | ............................ 224/578 |
| 3,789,512 | A | * | 2/1974 | Gros | ................................. 33/393 |
| 4,439,032 | A | * | 3/1984 | Congdon | ....................... 396/419 |
| 4,648,698 | A | * | 3/1987 | Iwasaki | ....................... 248/163.1 |
| D357,267 | S | | 4/1995 | Yotsuya | |
| D357,493 | S | | 4/1995 | Yotsuya | |

(Continued)

FOREIGN PATENT DOCUMENTS

WO    WO 2007112638 A1 * 10/2007 ............. F16M 13/02

OTHER PUBLICATIONS

Cellpod, website screenshot, Nov. 27, 2011, <www.industrialrev.com/cellpod.html>.

(Continued)

*Primary Examiner* — Terrell McKinnon
*Assistant Examiner* — Eret McNichols
(74) *Attorney, Agent, or Firm* — DWC Law Firm, P.S.; David Chen (57) ABSTRACT

A mounting device typically used for mounting line-of-site equipment, the mounting device including leg members that can fold into a trough like body of the mounting device, and further including a strap spool connected to an end portion of the mounting device. A strap on the strap spool can be unspooled and used to attach the mounting device to a surface.

17 Claims, 5 Drawing Sheets

(56) References Cited

U.S. PATENT DOCUMENTS

| | | | | |
|---|---|---|---|---|
| 5,497,214 | A * | 3/1996 | Labree | 396/428 |
| 5,513,784 | A * | 5/1996 | Pretorius | 224/584 |
| 5,622,342 | A * | 4/1997 | Mills | 248/126 |
| 5,632,461 | A * | 5/1997 | von Helms et al. | 248/218.4 |
| 5,897,039 | A * | 4/1999 | Swenke | 224/162 |
| 6,021,984 | A * | 2/2000 | Mills | 248/219.4 |
| D445,123 | S | 7/2001 | Shen | |
| 6,349,905 | B1 * | 2/2002 | Mills | 248/126 |
| D527,756 | S * | 9/2006 | Parker et al. | D16/242 |
| 7,290,740 | B2 * | 11/2007 | Joy et al. | 248/187.1 |
| 7,344,320 | B2 * | 3/2008 | Barker | F16M 11/14 135/66 |
| 7,364,320 | B2 * | 4/2008 | Van Deursen | F16M 11/16 248/177.1 |
| 7,494,291 | B2 * | 2/2009 | Saxton | 396/420 |
| 7,694,923 | B2 | 4/2010 | Joy et al. | |
| 8,276,310 | B1 * | 10/2012 | Weber | 43/21.2 |
| 8,294,815 | B2 * | 10/2012 | Matsuhashi et al. | 348/373 |
| D719,604 | S * | 12/2014 | Palmer | D16/244 |
| 2006/0197001 | A1 * | 9/2006 | Parker et al. | 248/230.8 |
| 2007/0151999 | A1 * | 7/2007 | Thompson | 224/150 |
| 2008/0229561 | A1 * | 9/2008 | Hondel | 24/586.11 |
| 2008/0232792 | A1 * | 9/2008 | Speggiorin | G03B 17/561 396/428 |
| 2009/0039229 | A1 * | 2/2009 | Barnes | 248/460 |
| 2009/0190917 | A1 * | 7/2009 | Chai | 396/428 |
| 2010/0214470 | A1 * | 8/2010 | Cottagnoud | 348/376 |
| 2011/0031358 | A1 * | 2/2011 | Fischer | 248/168 |
| 2011/0239376 | A1 * | 10/2011 | Schmidt | 7/167 |
| 2012/0195035 | A1 * | 8/2012 | Rodriguez et al. | 362/190 |
| 2013/0004153 | A1 * | 1/2013 | McKee et al. | 396/420 |
| 2013/0175413 | A1 * | 7/2013 | Waugh | 248/124.1 |
| 2013/0212921 | A1 * | 8/2013 | McDonald | 42/94 |
| 2013/0313394 | A1 * | 11/2013 | Hogan | 248/499 |
| 2014/0027593 | A1 * | 1/2014 | Pfeiler | F16M 11/045 248/274.1 |
| 2014/0093230 | A1 * | 4/2014 | Hale et al. | 396/423 |
| 2014/0252188 | A1 * | 9/2014 | Webster | 248/229.17 |
| 2015/0021451 | A1 * | 1/2015 | Clearman et al. | 248/229.13 |

OTHER PUBLICATIONS

Ultrapod Mini, website screenshot, Nov. 28, 2011, <www.industrialrev.com/ultrapod-mini.html>.

Ultrapod I, website screenshot, Nov. 27, 2011, <www.industrialrev.com/ultrapod-i.html>.

Ultrapod II, website screenshot, Nov. 29, 2011, <www.industrialrev.com/ultrapod-ii.html>.

Ultrapod II Digital, website screenshot, Nov. 27, 2011, <www.industrialrev.com/ultrapod-ii-digital.html>.

* cited by examiner

MOUNTING DEVICE

CROSS REFERENCE TO RELATED APPLICATION(S)

This application claims the benefit of U.S. provisional patent application Ser. No. 61/748,708, filed Jan. 3, 2013, which is incorporated herein by reference in its entirety.

BACKGROUND

1. Technical Field

The present disclosure relates to mounting devices for use with equipment having line-of-sight requirements or other positioning requirements, such as, for example, optical and lighting equipment, and more particularly, for use with cameras, spotting scopes, camcorders, binoculars, or the like.

2. Description of Related Art

Mounting devices for cameras and other optical equipment (e.g., cameras, spotting scopes, camcorders, binoculars, lighting, or the like) allow the optical equipment to be adjusted and secured to various positions in order to hold the optical equipment steady for clear, line-of-sight photos, accurate measurements, or lighting. The support structures for the mounting devices take various forms, including, for example, tripod structures. Some commercially available tripods are small and highly portable. Small tripod structures can be particularly useful for lightweight mobility, and are sometimes supplied with additional mounting accessories, such as straps, to provide the mounting device with capabilities to be secured to irregular or narrow surfaces. However, the straps can be cumbersome when not in use, in part, because they large compared to the overall size of the small portable tripods and can thus be obstructive when not in use, or can be lost if removed.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials associated with mounting devices and optical equipment have not been described in detail to avoid unnecessarily obscuring the descriptions of the embodiments of the disclosure.

In the present description, to the extent the terms "about" and "approximately" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and those terms, and variants thereof, are intended to be construed as non-limiting.

Various embodiments in this disclosure are described in the context of use with cameras and tripods. However, as will be understood by those skilled in the art after reviewing this disclosure, a variety of other optical equipment may be suitable for use with the disclosed mounting devices, and various other base mount structures, such as, for example, clamps, instead of tripods, may be substituted for the tripod structure in some circumstances, and may also contain the strap spool as described herein.

Figure 1:
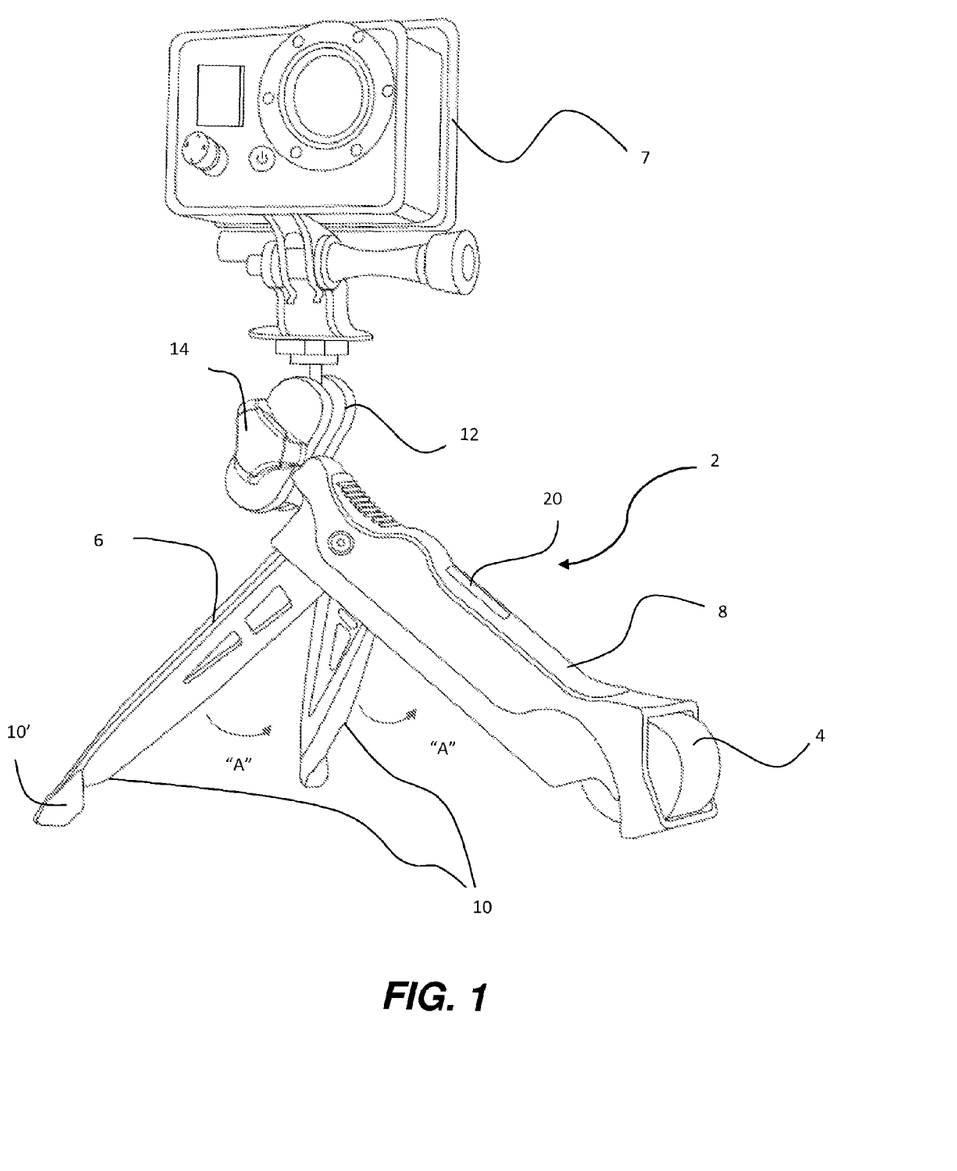
FIG. 1 is a perspective view showing an embodiment of a mounting device of the present disclosure with a camera attached thereto and an adjustable tripod support structure.

As illustrated in FIG. 1, in some embodiments, a camera 7 can be connected to mounting device 2, via a joint 12 of the mounting device 2, which is, in turn, attached to a base, such as a tripod 6. The joint 12 can include a threaded member for use in attaching the joint directly to the camera 7, or to a connection adaptor, which in turn, can be connected to the camera or other optical equipment. The camera 7 can be positioned at various angles by positioning the tripod 6 and manipulating the joint 12, with the joint 12 being rotatable and pivotable in various planes to accommodate a plurality of angles and positions for the camera 7 to adjust its line of sight, as will be appreciated by those skilled in the art upon reviewing this disclosure. In some embodiments, a tightening knob 14 is provided for securing the joint 12 in a selected position.

Figure 2:
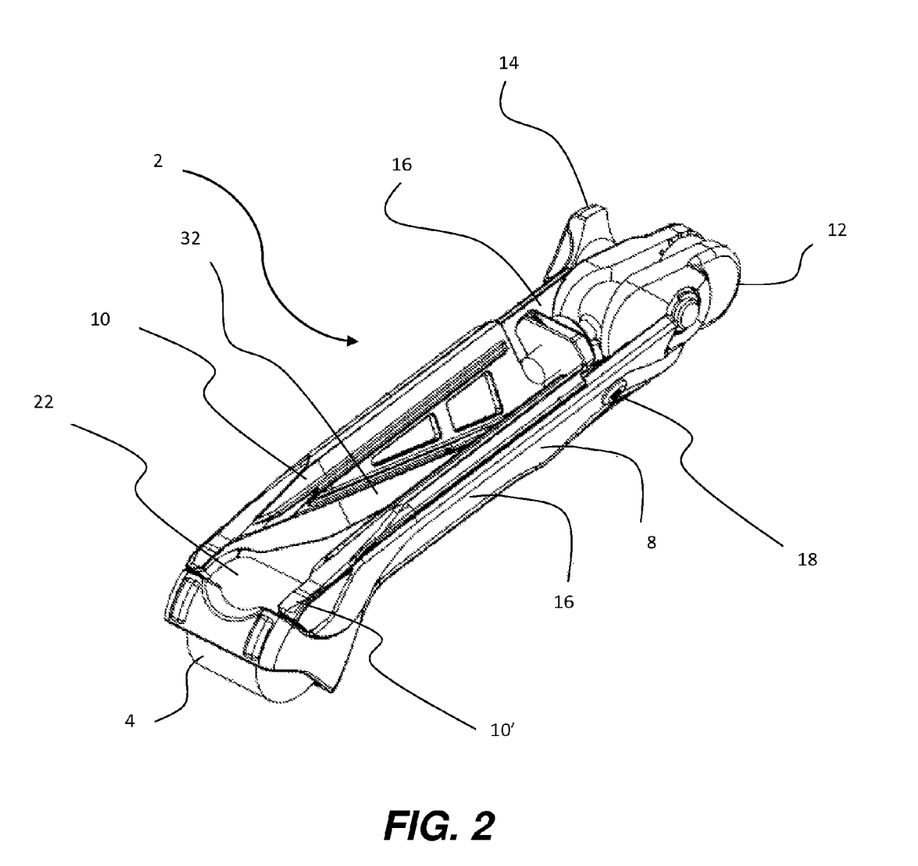
FIG. 2 is a back side perspective view of the mounting device of FIG. 1, with legs of the tripod being folded inward within a trough of the mounting device.
Figure 3:
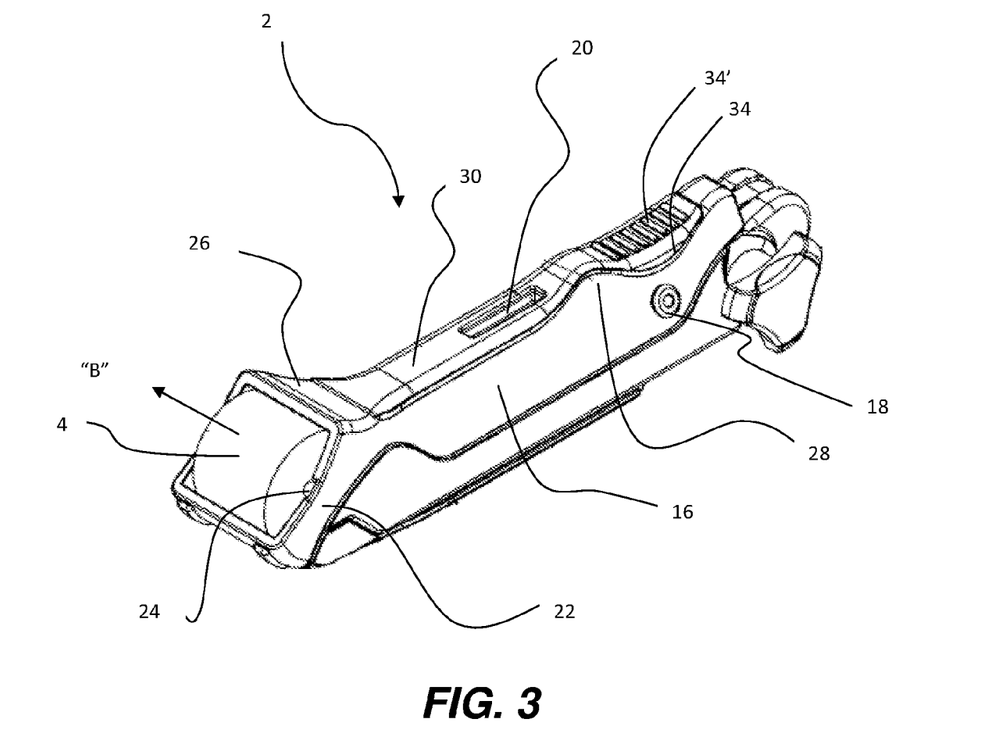
FIG. 3 is a front side perspective view of the mounting device of FIG. 1, with the legs of the tripod being folded inward within the trough of the mounting device.

In some embodiments, the tripod structure 6 of the mounting device 2, to which the joint 12 is attached near a top of the tripod structure 6, can include a body portion 8, and a pair of adjustable legs 10. The body portion 8 may be formed as a trough-like structure with a longitudinal base wall 30, and a pair of sidewalls, or outer, walls 16, as best seen in FIGS. 2 & 3. The outer walls 16 can be angled laterally outward, away from a longitudinal axis of the base wall 30, as they extend from the base wall 30 toward the back side of the body portion 8.

The adjustable legs 10 can each be pivotably attached to one of the respective outer walls 16 of the body portion 8, such as by respective rivets 18 (e.g., one rivet for each one of the pair of adjustable legs 10, but only one rivet is shown in FIGS. 2 & 3). In particular, a top end portion of each adjustable leg 10 can be pivotably attached to an inner surface of a respective outer wall 16, near a top portion of the body portion 8 (e.g., near the joint 12). From an expanded position, as shown in FIG. 1, the legs 10 can be pivoted inward, in directions generally illustrated by arrows "A," toward the back side of the body portion, to rest within a trough 32 of the body portion 8, as shown in FIGS. 2 & 3, along a length of the body portion 8, in a folded position, against inner surfaces of the outer walls 16, with longitudinal axes of the legs 10 being substantially parallel to a longitudinal axis of the body portion 8.

In addition, when the legs 10 are moved out of the folded position, by manually pivoting them outward about the rivets 18, in opposite directions to those generally illustrated by arrows "A," such as shown in FIG. 1, the pair of legs 10 can be angled laterally outward away from the body portion 8, to be used as a tripod 6, with a bottom of the body portion 8 and a bottom of each of the pair of legs 10 providing a point of contact for a surface.

In some embodiments, the walls 16 of the trough like body portion 8 are flared laterally outward as they extend away from the base wall 30, to form the orientation of the tripod when the legs 10 are expanded. That is, for example, since the legs 10 are aligned and attached to the surface of the flared walls 16, when they are unfolded/expanded, they can each assume an angle directed away from each other so that the end portions of the legs 10 are spread apart, such that the bottom portion 10' of the legs 10 are further apart from each other than they are at the points at which they join the body portion 8, as best seen in FIG. 1.

In some embodiments, the body portion 8 can be shaped for manual gripping, such as when the legs 10 are folded into the trough 32 of the body portion 8, out of the way, and a user desires to grip the body portion 8 to position a camera connected to the mounting device, without resting the mounting device against another surface (other than within the user's hand in a grip). For example, as shown in FIG. 3, the longitudinal base wall 30 can be shaped near a top portion thereof with an outwardly forwardly curved rise 28, followed by in inwardly curved dip 34 (upward of the rise 28), upon which can be disposed grip ribs 34', which can be elastomeric for comfort and conformity to a user's fingers or hand.

Figure 4:
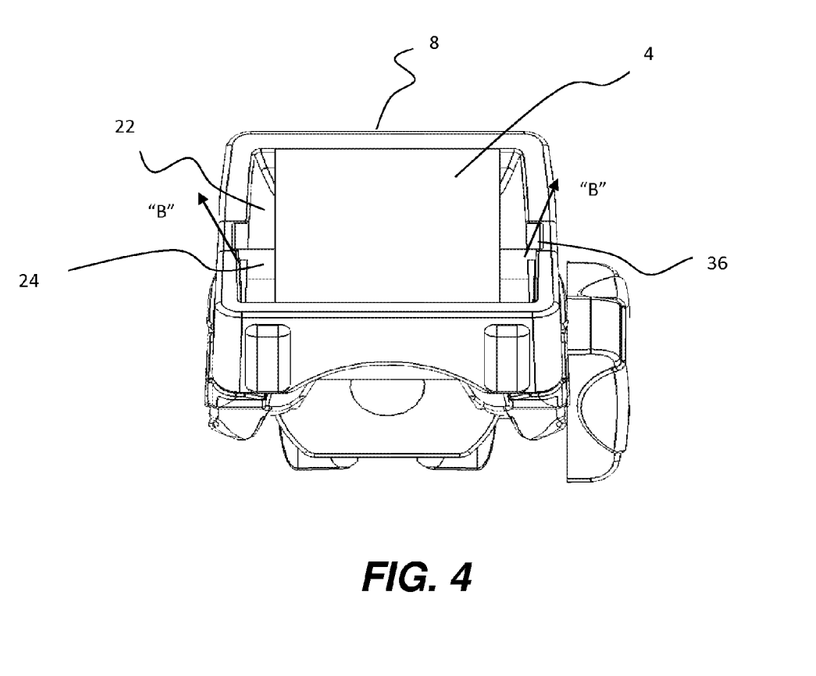
FIG. 4 is a bottom side elevation view of the mounting device of FIG. 1, showing a close up view of a strap spool of the mounting device.

Also, as best seen in FIGS. 2, 3, and 4, a bottom portion of the body portion 8 can include an open chamber 22 for housing a strap spool 4. The body portion 8 can have a bottom outward curvature 26, curving outwardly forwardly at the open chamber 22. Thus, a user can manually grip the body portion 8 with the user's fingers wrapped about the longitudinal base wall 30, with the trough 32 facing a base of the palm of the user's hand, and can place an index finger wrapped about the inwardly curved dip 34 touching the grip ribs 34', to comfortably grip the mounting device 2, when in use with a camera mounted thereto. In such case, the mounting device 2 can serve as a handle, as will be appreciate by those skilled in the art after reviewing this disclosure. The bottom curvature 26 can be disposed just below the users little finger to prevent slipping upward into the palm, and an index finger of the user can be placed on the grip ribs 34' at the front of the body portion 8, in the dip 34, to help prevent the body portion 8 from slipping from the user's grip. The overall contour of the body portion 8 generally provides a comfortable form fit to a hand for gripping, as will be appreciated by those skilled in the art after reviewing this disclosure.

In some embodiments, the strap spool 4 can be removably attached in the open chamber 22 via a shaft 24, as best seen in FIGS. 3 & 4. The strap spool 4 can comprise a flexible hook and loop strap 5 wrapped about the shaft 24, and the shaft 24 can be inserted within the chamber 22 by placing end portions of the shaft 24 within indented tracks 36 formed on an interior surface of the chamber 22. The chamber 22, and a front facing wall of the chamber 22, can be wider than the base wall 30 at any location above the chamber 22, in order to accommodate a width of the strap spool 4 or length of the shaft 24. The tracks 36 can be angled upward and extend backward from an opening of the chamber 22, into the chamber 22, and the end portions of the shaft 24 can be pressed into the indented tracks 36 so that ends of the shaft 24 abut against surface walls within the tracks 36, snugly enough to produce sufficient friction between the shaft 24 and tracks 36 to hold the shaft 24 unless it is manually pulled away, but loose enough to allow the shaft 24 to be pressed into the track 36 until the strap spool 4 snugly rests at least partially within the open chamber 22. The strap spool 4 can be selectively removed by pulling it out of the chamber 22 in the direction generally illustrated by arrows "B" in FIGS. 3 & 4 for use. Alternatively, the strap spool 4 can remain attached within the chamber 22 when in use, as described further below.

For example, the strap spool 4 can be rotatable about an axis of the shaft 24, without detaching the shaft 24 from the open chamber 22, by rotating the shaft 24 (or in some embodiments, if the strap is not fixedly attached to the shaft itself, the shaft 24 can be stationary, and the strap 5 can simply be wrapped or unwrapped about the shaft).

Figure 5:
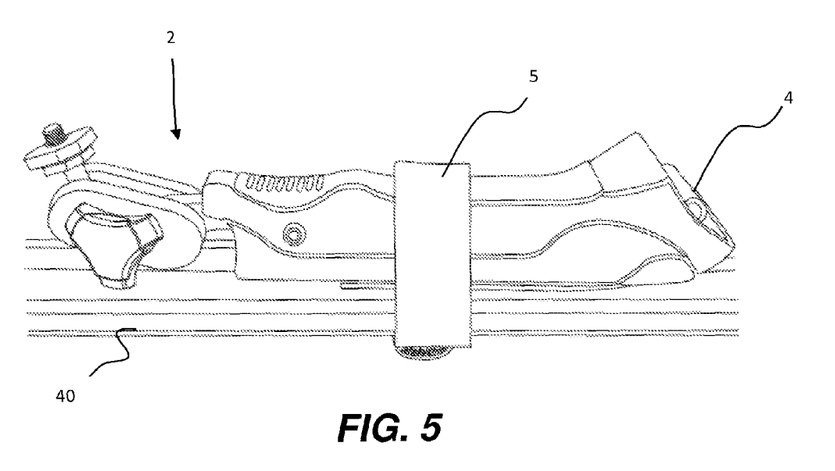
FIG. 5 is perspective view of the mounting device of FIG. 1, showing the strap of the strap spool of the mounting device being at least partially unspooled and passed through a slot on the body portion of the mounting device, and used to wrap about an object or surface to secure the mounting device to the object or surface.

Referring to FIGS. 3 & 5, in some embodiments, when a user desires to employ the strap 5, the user can unspool a portion of the strap 5 while the shaft remains attached within the chamber 22, then thread the strap 5 from within the trough 32, out through a slot 20 formed on the body portion 8 of the mounting device 2 (the slot 20 is best seen in is FIGS. 1 & 3). In some embodiments, the slot 20 can be disposed at about a longitudinally middle section of the body portion 8. The user can then continue to pull the strap through the slot 20 while, or before, wrapping the strap about a surface 40, such as shown in FIG. 5. In some embodiments, the user can remove the strap spool 4 from the chamber 22, and place the strap spool 4 within the trough 32 proximate the slot 20, before, after or while, threading the strap 5 through the slot 20. This can provide more available strap 5 length, and an inner end of the strap 5 can be prevented from being pulled through the slot 5 by being fixedly attached to the shaft 24, the shaft length being greater than the slot length, and/or the shaft width being greater than the slot width. Also, in other embodiments, a user may use the strap 5 without threading it through the slot 20 at all, as will be appreciated by those skilled in the art after reviewing this disclosure.

In some embodiments, the strap can be formed of hook-and-loop self-fastening material (e.g., VELCRO™), so that the one side, or face, of the strap 5 comprises wire-like miniature hooks, and the other side, or face, comprises flexible miniature loops. This can allow the user to secure the strap 5 against itself, face to face, after wrapping the strap about a surface, to secure the entire mounting device 2 (including a camera or other line-of-sight device) to the surface.

Thus, a user can either use the tripod structure to rest the mounting device 2 during use, or to secure the mounting device 2 (e.g., with connected camera) to a surface using the strap 5. In some embodiments, with the legs 10 folded inward, the mounting device can be secured to a surface using the strap 5, such as, for example, a branch of tree, wherein a user is using the mounting device 2 to hold a camera 7 in taking timed photographs. Also, the surface to which the mounting device 2 can be secured by the strap 5 can be a moving surface, such as, for example, the frame of a bike, wherein the user is capturing videos while the bike is moving.

In other embodiments, the tripod structure can be used simultaneously with the strap 5, such as by, for example, straddling the tripod legs and body portion about a thin object/surface, then connecting the body portion 8 to the surface or another surface using the strap 5, or even resting the legs and body of the tripod structure on a surface, and using the strap 5 to secure the mounting device 2 to another surface. Also, the mounting device 2 can be used as a handle as described previously, where the user can grip it in the palm of the user's hand to position line of sight equipment.

When it is desired to detach the strap from a surface, a user can manually detach the hook-and-loop connected portions, then spin or rotate the strap spool 4 to retract the strap 5 about the shaft 24. In the case the strap spool 4 has been removed from the open chamber 22, it can be conveniently re-attached to the chamber 22 by placing the shaft within the tracks 36, as will be appreciated by those skilled in the art after reviewing this disclosure.

Although specific embodiments of the present disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described structures and methods can omit some elements or acts, can add other elements or acts, or can combine the elements or execute the acts in a different order than that illustrated, to achieve various advantages of the disclosure. These and other changes can be made to the disclosure in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A mounting device, comprising:
   an elongated body portion having a bottom portion including a chamber and a top portion;
   a connector connected to the top portion for use in connecting optical equipment to the body portion;
   a strap spool comprising a hook and loop strap material that is wound about a shaft in overlapping fashion, or fully wound about the shaft, and which can be unspooled from the shaft; and
   wherein the strap spool is removably attached to the bottom portion of the elongated body portion within the chamber by end portions of the shaft being retained within indented tracks formed on an interior surface of the chamber, wherein the indented tracks extend into the chamber from an edge of an entrance opening of the chamber, and wherein the entrance opening and indented tracks are configured to receive the strap spool by insertion of the strap spool into the entrance opening.

2. The mounting device of claim 1 further comprising a pair of leg members, each leg member being pivotably attached to the body portion.

3. The mounting device of claim 2 wherein the body portion comprises a longitudinally extending base wall defining a front side of the body portion, the longitudinally extending base wall having a pair of opposite longitudinally extending lateral edges and an outer wall extending from each of the pair of lateral edges in a laterally outwardly flared direction toward a back side of the body portion, with the leg members being pivotably attached to inside surfaces of the outer walls.

4. The mounting device of claim 1 further comprising a slot extending completely through a wall of the body portion and formed on a location at about a longitudinally middle section of the body portion.

5. The mounting device of claim 4 wherein the chamber is wider in width than a base wall of the body portion.

6. A mounting device, comprising:
   a body portion having a longitudinally extending base wall, with a slot formed on the base wall extending entirely through the base wall, and a pair of longitudinally extending laterally flared outer walls, the longitudinally extending base wall defining a front side of the body portion and the laterally flared outer walls extending toward a back side of the body portion from the front side, with one laterally flared outer wall attached to each side of the longitudinally extending base wall, the longitudinally extending base wall and the pair of laterally flared outer walls defining a trough having a back side longitudinally extending opening disposed opposite the front side;
   a pair of leg members, with one of the pair of leg members pivotably attached to each of the pair of laterally flared outer walls; and
   a strap spool comprising a hook and loop strap material wound about a shaft in overlapping fashion, or fully wound about the shaft, with the shaft removably connected to a bottom portion of the body portion within a chamber formed at the bottom portion, the chamber having an opening at an end of the bottom portion and also having an interior opening exposed to the longitudinally extending opening of the trough through which the strap material can be passed to the slot when unspooled from the shaft, wherein the slot is disposed at a location that is longitudinally spaced apart from the strap spool.

7. The mounting device of claim 6 wherein the leg members can be folded within the trough of the body portion.

8. The mounting device of claim 7 wherein the longitudinally extending base wall includes a curved contour having grip ribs formed on at least a portion of the curved contour.

9. The mounting device of claim 8 wherein walls of the chamber curve laterally outwardly while extending along the longitudinally extending base wall at the bottom portion of the body portion.

10. The mounting device of claim 6 wherein the shaft is removably connected to the chamber by being snugly inserted within indented tracks formed on inside surfaces of walls of the chamber.

11. A method of attaching optical equipment attached to a mounting device to a surface, the method comprising the steps of:
   unspooling a strap from a strap spool that is removably attached to an elongated body portion of the mounting device;
   threading the strap from a location within a longitudinally extending trough of the elongated body portion through a slot located on the elongated body portion, the elongated body portion having a longitudinally extending base wall that defines a front side of the elongated body portion, the longitudinally extending trough being at least partly defined by a pair of longitudinally extending outer walls that each also extend backward toward a back side of the elongated body portion, the longitudinally extending trough being open on the back side and wherein the strap is longitudinally extended through the longitudinally extending trough before being threaded through the slot; and
   wrapping the strap about a surface after threading it through the slot and securing the strap to the surface.

12. The method of claim 11 further comprising, detaching the strap spool from the body portion and placing the strap spool within the trough through the back side of the body portion near the slot and threading the strap through the slot.

13. The method of claim 11 wherein the surface is a portion of a bike frame.

14. The method of claim 11 further comprising folding pivotable legs of the mounting device inward into the trough.

15. The method of claim 11 wherein the longitudinally extending base wall includes a curved portion having user grips.

16. The method of claim 11 wherein the strap spool is removably attached to the elongated body portion within a chamber of the body portion by being inserted into an entrance opening of the chamber.

17. The method of claim 16 wherein the chamber includes indented tracks extending into the chamber from an edge of the entrance opening, to which the shaft of the strap spool is removably attached, and further comprising removing the strap spool by pulling the shaft away from the intended tracks.

* * * * *